United States Patent
McVay et al.

[11] 3,717,536
[45] Feb. 20, 1973

[54] TUBE-MAKING APPARATUS

[75] Inventors: David Robert McVay, Hazlehurst; Henry Louis Eickhoff, Dunwoody; Harry William Thatcher, Hazlehurst, all of Ga.

[73] Assignee: Standard Oil Company, Chicago, Ill.

[22] Filed: Dec. 7, 1970

[21] Appl. No.: 95,816

[52] U.S. Cl. ..............156/463, 156/466, 156/547, 242/57.1, 93/8 R, 270/83
[51] Int. Cl. ..............................................B29d 23/00
[58] Field of Search......156/199, 200, 202, 203, 204, 156/459, 461, 465, 466, 361, 463, 443, 448; 270/86, 93, 94; 93/8 R, 20; 242/7.23, 57.1

[56] References Cited

UNITED STATES PATENTS

| | | | |
|---|---|---|---|
| 3,557,156 | 1/1971 | Enneper et al. | 156/202 |
| 2,673,495 | 3/1954 | Hecker et al. | 156/203 |
| 3,345,965 | 10/1967 | Gore | 270/94 |
| 3,082,715 | 3/1963 | Lofgren | 270/86 |
| 3,381,397 | 5/1968 | Cohn et al. | 83/175 |
| 2,540,844 | 2/1951 | Strauss | 270/93 |
| 2,660,219 | 11/1953 | Haas et al. | 156/466 |
| 2,968,449 | 1/1961 | Hajos | 242/57.1 |
| 3,222,005 | 12/1965 | Wendelken | 242/57.1 |

*Primary Examiner*—Robert F. Burnett
*Assistant Examiner*—R. J. Roche
*Attorney*—Arthur G. Gilkes, William T. McClain and John J. Connors

[57] ABSTRACT

Disclosed is a method and apparatus for forming tubes from woven fabric, especially fabric made of polymeric ribbon yarns. The apparatus includes a movable carriage including a spindle on which a roll of the woven fabric is rotatably mounted. The fabric is unwound and passed over folding means which bring outer edges of the fabric into an overlapping position. An extruder applies a hot melt adhesive to the overlapping edges and then a series of chilled pressure rollers squeeze the overlapping edges together, cooling the adhesive and forming a seam. This fabricates a tube which is periodically severed into shorter lengths.

10 Claims, 12 Drawing Figures

3,717,536

TUBE-MAKING APPARATUS

BACKGROUND

Woven polymeric fabric is a strong, mildew-resistant material, and bags made of such fabric would be highly useful. However, this fabric is difficult to handle when making bags. For example, it is difficult to sew and requires large numbers of workers to produce a relatively small number of bags. The objective of our invention is to provide a method and apparatus which will automatically make from this fabric tubes that can be then readily made into bags. Our apparatus is highly efficient and reliable, as well as easy to maintain. The details of our method and apparatus are disclosed in the accompanying drawings and description.

PREFERRED EMBODIMENT

In General

Figure 1:
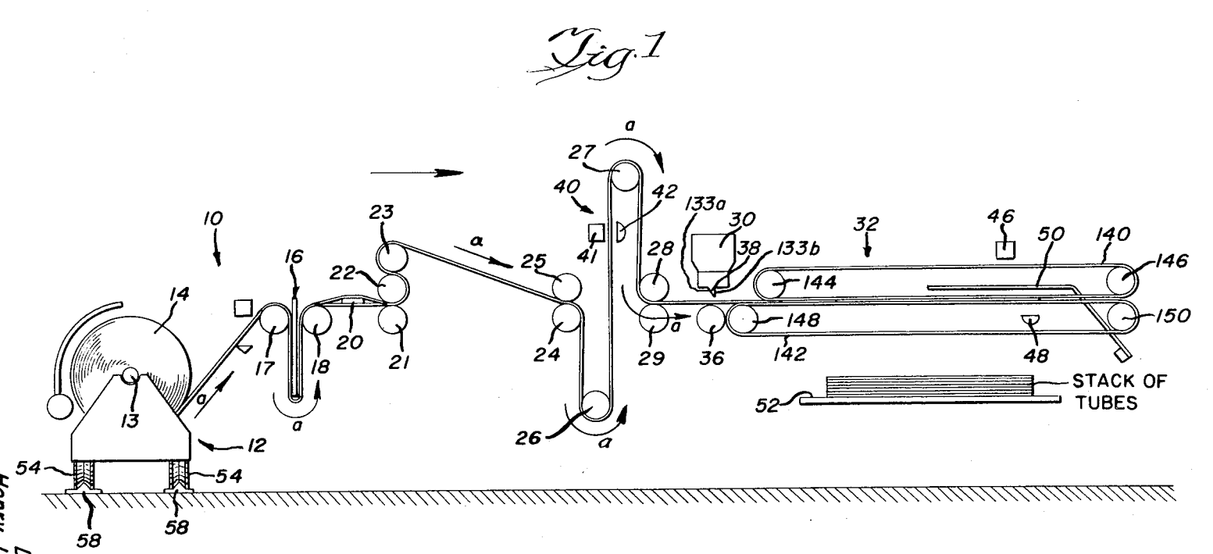
FIG. 1 is a schematic view showing the overall arrangement of the principal components of our tube-making apparatus.

The general arrangement of our tube-making apparatus 10 is schematically depicted in FIG. 1. The principal components of this apparatus are movable carriage 12 including spindle 13 on which roll 14 of fabric is rotatably mounted, folding means 16 between rollers 17 and 18, extruder including die 20 for applying a sealant such as a hot melt adhesive, a series of water-cooled chill rollers 21–23, primary drive rollers 24 and 25, dancer roller 26, idler roller 27, secondary drive rollers 28 and 29, cutter 30 and conveyor 32.

Figure 4:
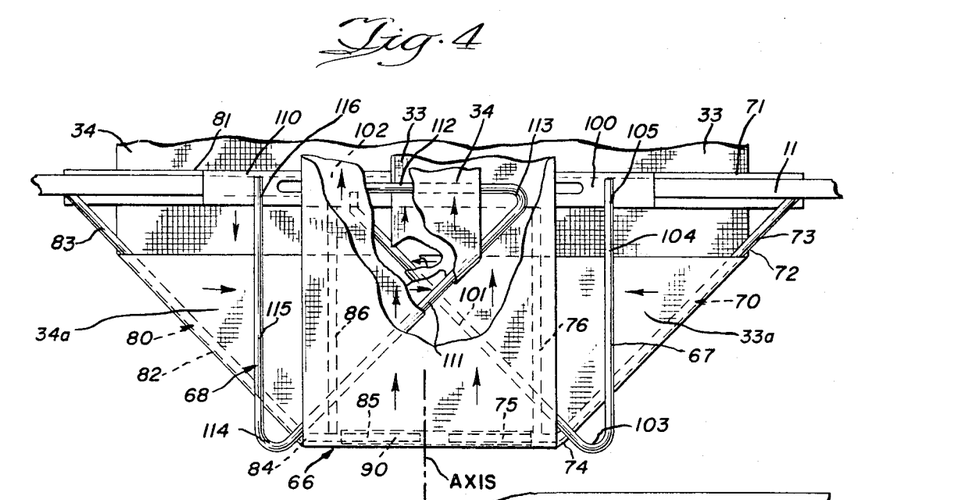
FIG. 4 is a front elevational view from behind the folding means, looking toward the roll of fabric and showing fabric moving around the elements of the folding means to form a tube.
Figures 5, 6, 7:
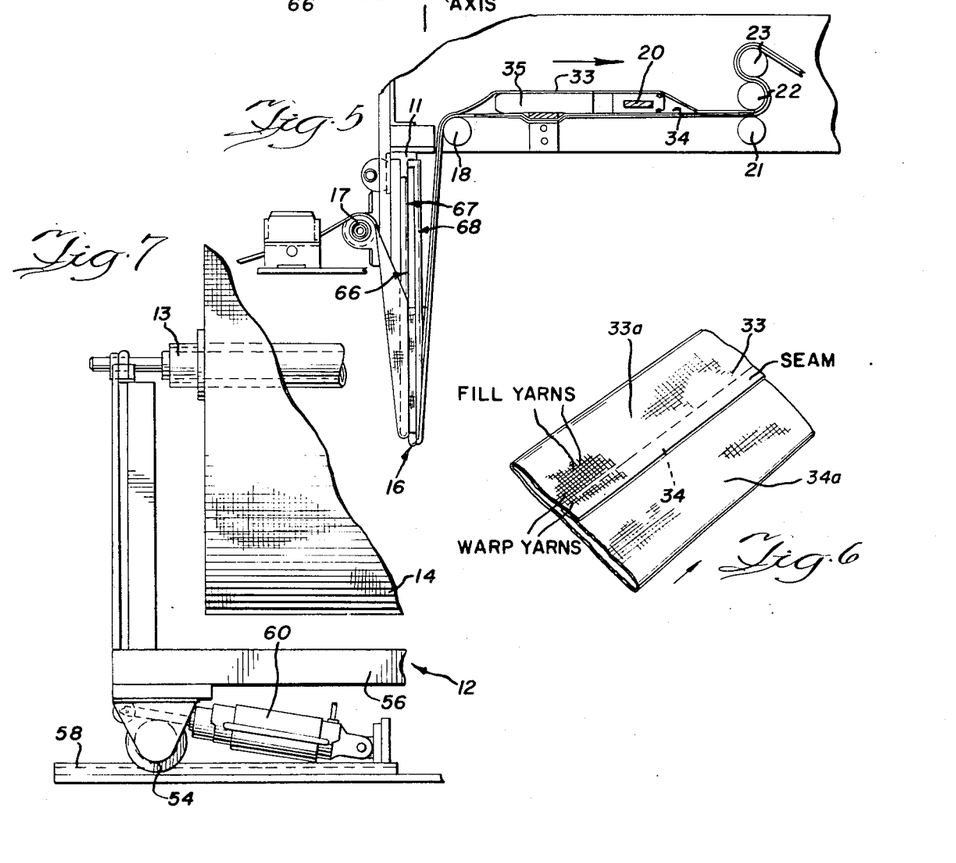
FIG. 5 is a side elevational view showing the tube moving over the extruder die which applies a hot melt adhesive to overlapping edges of the folded fabric.
FIG. 6 is a perspective view showing a portion of the tube formed by our apparatus.
FIG. 7 is an elevational view, with sections broken away, of the carriage which carries the roll of fabric.

The fabric comprises woven, oriented, generally flat, warp and fill ribbon yarns made from polymeric material, preferably polypropylene. This fabric moves through apparatus 10 along the sinuous path indicated generally by arrows a, and as it moves around folding means 16 the fabric is folded so that the ends of the fill yarns along fabric edges 33 and 34 (FIGS. 2, 4 and 6) are brought into an overlapping position. Extruder die 20 applies a hot melt adhesive to overlapping edges 33 and 34 and chill rollers 21–23 next apply pressure to these overlapping edges to form the seam of a tube. FIG. 6 shows the folded, seamed material making up the tube. Optionally, a heater 35 (FIGS. 2 and 5) may be provided to preheat the overlapping edges 33 and 34 prior to application of the adhesive.

Primary drive rollers 24 and 25 and secondary drive rollers 28 and 29 move the seamed tube through apparatus 10 between cutter 30 and Teflon-covered platen roller 36 directly below blade 38 of cutter 30. Rollers 24 and 25 move continuously. Rollers 28 and 29 move intermittently. When secondary drive rollers 28 and 29 momentarily stop, cutter 30 lowers down on platen roller 36 to sever the tube into a predetermined length. With the cutting of the tube, a slack develops in the tube coming from primary drive rollers 24 and 25. This slack occurs because the tube is continuously advanced by rollers 24 and 25 while its forward portion is momentarily stopped and held by secondary drive rollers 28 and 29. Dancer roller 26 takes up this slack.

Figure 8:
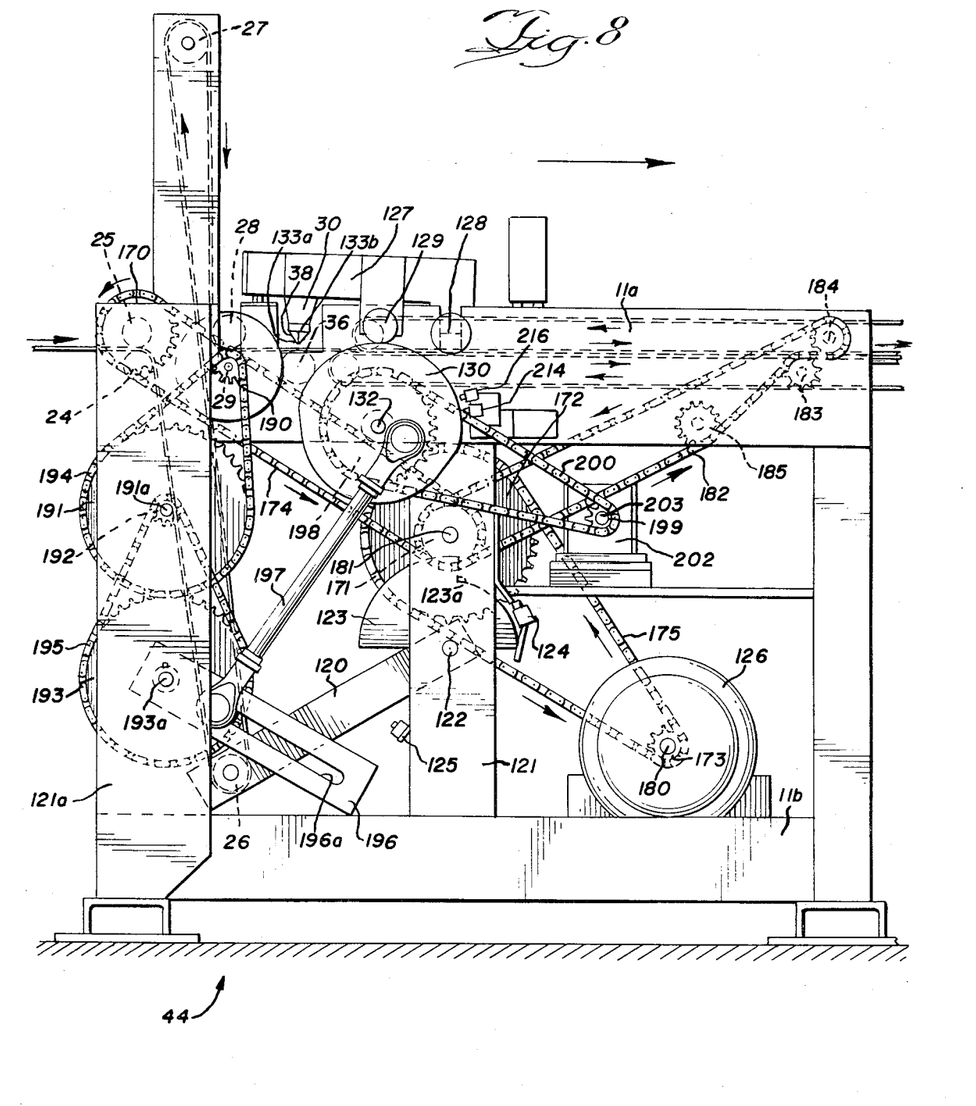
FIG. 8 is a side elevational view of the drive system for our apparatus.
Figure 9:
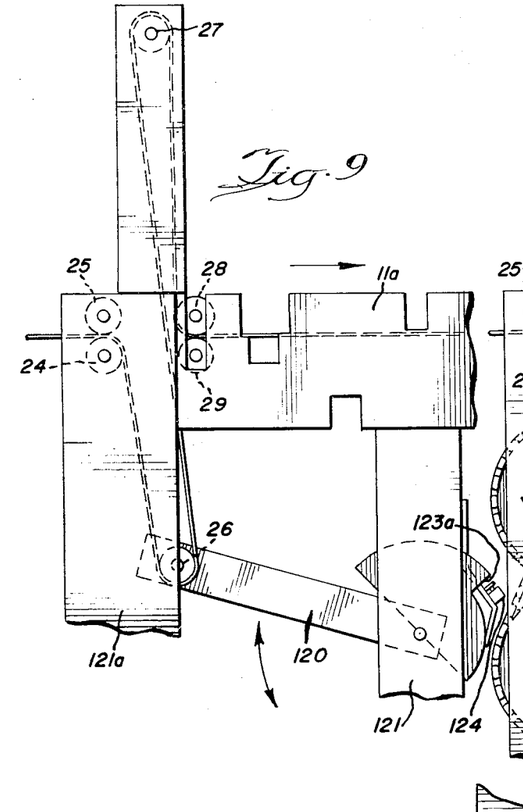
FIG. 9 is a side elevational view of the drive system, with components deleted for clarity, showing the dancer roller in the raised position.
Figure 10:
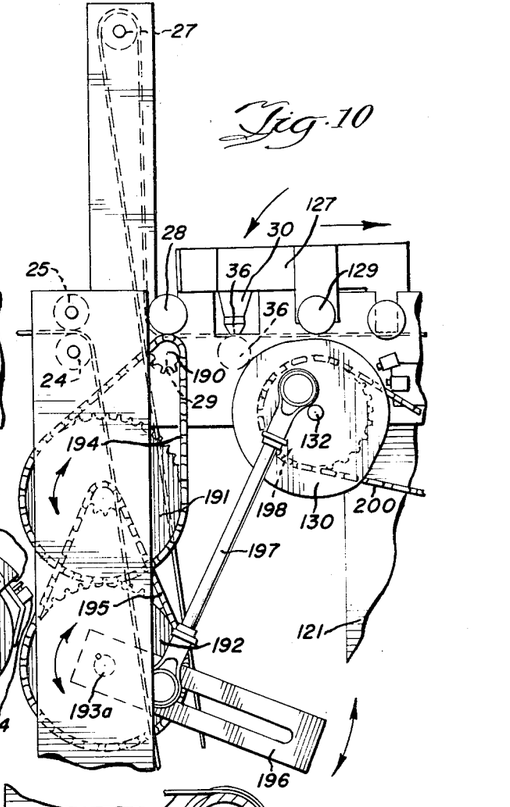
FIG. 10 is a side elevational view of the drive system, with components deleted for clarity, showing the cutter in the down position severing the tube.

A conventional Deitz scanner 40, including photocell 41 and light source 42, may be used to control the operation of rollers 28 and 29 and cutter 30 by reading registration marks printed on the fabric or, as we prefer, the operation of the rollers and cutter is controlled with or without the Deitz scanner by drive system 44 shown in FIGS. 8–10. This drive system 44 will be discussed later in detail.

Conveyor 32 advances the severed tube to move between photocell 46 and light source 48 which straddle the tube's path. The severed tube interrupts the beam of light striking photocell 46 and this produces a signal which actuates swatter arm 50. Arm 50 pivots downwardly to free the tube from the grasp of conveyor 32, and the severed tube thus falls onto table 52. Periodically, the stack of severed tubes is removed from table 52 and further processed to make bags.

THE CARRIAGE

Figure 2:
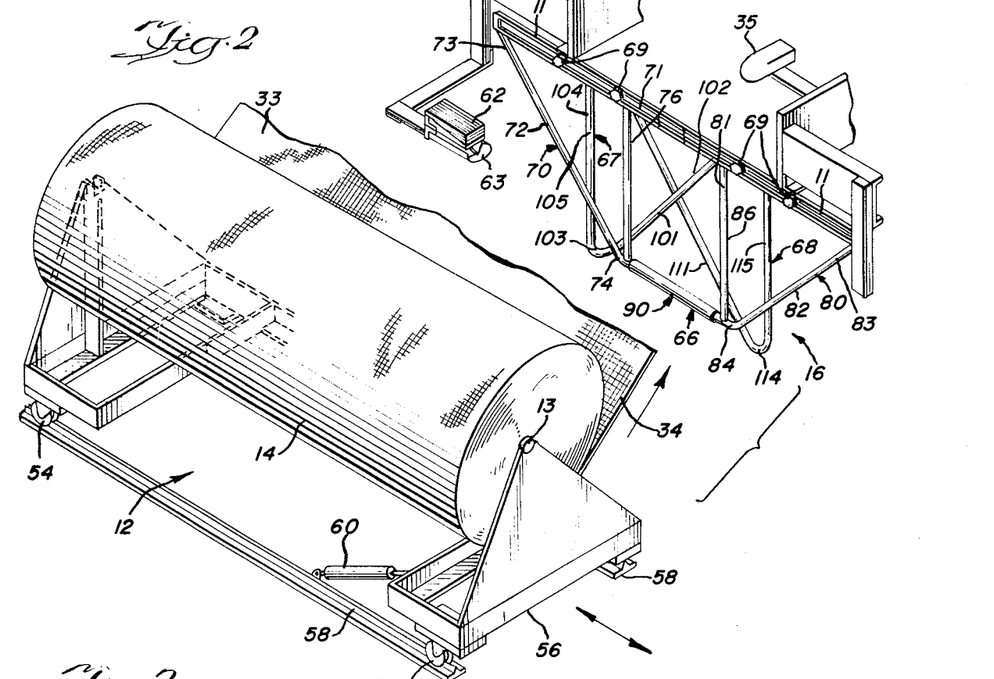
FIG. 2 is a perspective view showing fabric being unwound and moved toward the folding means.
Figure 3:
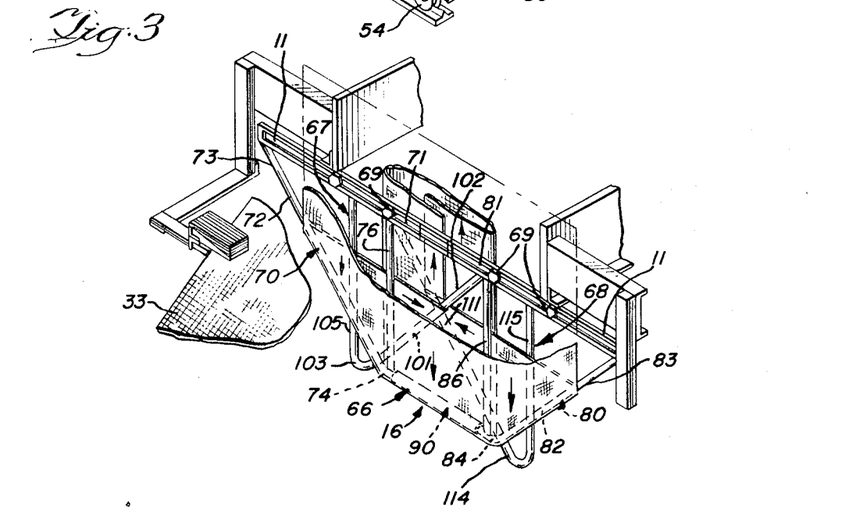
FIG. 3 is a perspective view from in front of the folding means, looking from the roll of fabric toward the folding means and showing fabric moving around the elements of the folding means to form a tube.

To insure that the overlapping edges 33 and 34 are properly aligned with extruder die 20, carriage 12 is mounted to move to and fro generally transverse to the fabric's direction of travel. As best seen in FIGS. 2 and 7, grooved casters 54 attached to base 56 of carriage 12 rests on tracks 58, and pneumatic piston 60 connected to the base of the carriage and a track serves to move the carriage. This piston 60 includes a pair of solenoids (not shown) which are actuated by a control circuit including photoelectric cell 62 and light source 63 which straddle the path of travel of the fabric. When the beam of light striking photocell 62 is interrupted by fabric edge 33 (FIG. 3) as carriage 12 moves toward the left, as viewed in FIG. 3, a signal is generated which actuates one piston solenoid to move the carriage in the opposite direction, i.e., toward the right. When fabric edge 33 moves from between photocell 62 and light source 63, the beam of light once again strikes photocell 62. This generates a signal which actuates the other piston solenoid causing carriage 12 to return to the left. Thus carriage 12 continues to move to and fro as fabric is unwound from roll 14.

The fabric has essentially a constant width but it is not wrapped around spindle 13 uniformly. By sensing the lateral movement of fabric edge 33 and continually moving carriage 12 to and fro, edge 33 is maintained at an essentially constant position relative to extruder die 20. Thus, as the fabric moves around folding means 16, the overlapping edges 33 and 34 are also maintained at a constant position relative to die 20. This insures that the adhesive is applied only along the overlapping edges 33 and 34, since the to and fro motion of carriage 12 always brings these edges into alignment with die 20.

FOLDING MEANS

As best shown in FIG. 2, folding means 16 has three chief folding elements 66–68. The upper supports of these elements 66–68 include slots with bolts 69 passing through the slots and securing these elements to frame 11 of apparatus 10. This brings the three chief folding elements 66–68 into spaced relationship with each other. All are in different but proximate generally vertical planes, with element 67 between elements 66 and 68. By loosening the bolts and laterally sliding elements 66–68 into different positions, different widths of fabric can be folded.

Of the three, folding element 66 is the most intricate. It includes three sections — 70, 80 and 90. Section 70 includes horizontal, slotted support 71 (FIG. 4) and tubular guide member 72 connected at its upper end 73 to support 71. Tubular guide member 72 lies in a generally vertical plane and is disposed at an angle of about 45° with respect to support 71. As the fabric moves around member 72 (FIG. 4), upper end 73 of member 72 is near fabric edge 33 and lower end 74 of member 72 is between fabric edge 33 and the central longitudinal axis of the fabric. Extending from end 74 is a generally horizontal stub 75 which lies along a line that is generally perpendicular to the longitudinal axis of the fabric. Brace 76 connects stub 75 to upper slotted support 71 and provides structural rigidity to section 70.

Section 80 is virtually identical in construction to section 70, but is mounted on frame 11 of the apparatus so that sections 70 and 80 are in a left- and right-hand relationship, respectively, as viewed in FIG. 2. Specifically, section 80 includes horizontal, slotted support 81 and tubular guide member 82 connected at its upper end 83 to slotted support 81. Tubular guide member 82 lies in a generally vertical plane and is disposed at an angle of about 45 with respect to support 81. As the fabric moves around member 82 (FIG. 4), upper end 83 of member 82 is near fabric edge 34, and lower end 84 of member 82 is between fabric edge 34 and the central longitudinal axis of the fabric. Extending from end 84 is a generally horizontal stub 85 which lies along a line that is generally perpendicular to the longitudinal axis of the fabric. Brace 86 connects stub 85 to upper slotted support 81 and provides structural rigidity to section 80. Sections 70 and 80 are in the same vertical plane and on the same side of the fabric. But, because they are arranged in a right- and left-hand relationship to each other, their respective guide members 72 and 82 slope toward each other so that their respective lower ends 74 and 84 are closer to each other than their respective upper ends 73 and 83.

Section 90 is a tubular sleeve, also serving as a guide member, which is fitted over the opposing stubs 75 and 85. Section 90 is generally perpendicular to the fabric's longitudinal axis. FIG. 2 shows sections 70 and 80 moved as close together as possible, with stubs 75 and 85 almost touching while disposed within section 90 (FIG. 4). Since sections 70 and 80 can be moved independently by loosening bolt 69 and moving these sections toward or away from each other, when these sections 70 and 80 are moved apart stubs 75 and 85 slide within section 90 and move away from each other.

Folding element 67 includes horizontal, slotted support 100 (FIG. 4) and tubular guide member 101 connected at its upper end 102 to support 100. Tubular guide member 101 lies in a generally vertical plane and is disposed at an angle of about 45 with respect to support 100. As the fabric moves around member 101 (FIG. 4) upper end 102 of member 101 is near fabric edge 33 and lower end 103 of member 101 is between fabric edge 33 and the central longitudinal axis of the fabric. Integral with end 103 is vertical brace 104 which has an upper end 105 connected to support 100.

Folding element 68 is somewhat similar in construction to folding element 67 but it is mounted on frame 11 so that element 68 and element 67 are in a left- and right-hand relationship, respectively, as viewed in FIG. 4. Element 68 includes an upper slotted support 110 and tubular guide member 111. Instead of member 111 being connected directly to support 110, connecting rod 112, integral with upper end 113 of guide member 111, connects member 111 to support 110. Connecting rod 112 is generally horizontal and spaced from support 110 so that longitudinal edge 33 can move between this connecting rod and support 110. Integral with end 114 is vertical brace 115 which has an upper end 116 attached to support 110.

As previously mentioned, all folding elements 66–68 are attached to frame 11. Supports 71 and 81 of folding element 66 are attached to one side of frame 11, and supports 100 and 110 of folding elements 67 and 68 are attached to the opposite side of frame 11. This places the three folding elements 66–68 in three different, generally vertical planes, spaced apart but in close proximity to each other so that the fabric can wind about these elements as shown in FIGS. 2 through 5. As fabric moves along its predetermined path $a$, guide members 72 and 82 of folding element 66 are in advance of guide member 101 and guide member 111 of folding elements 67 and 68, respectively. Because folding elements 67 and 68 are arranged in a right- and left-hand relationship to each other, their respective guide members 101 and 111 slope toward each other so that their respective upper ends 102 and 113 crisscross. This crisscross brings longitudinal edges 33 and 34 into overlapping relationship as the fabric winds around elements 67 and 68.

At start-up, the fabric is manually fed around folding means 16. As best viewed in FIGS. 4 and 5, the leading edge of the fabric is drawn across roller 17, pulled downwardly until it reaches the lower portion of folding element 66, opposite member 90. Then the outer quarter-section 33a of the fabric adjacent edge 33 is tucked inwardly and wrapped around guide member 72, and the outer quarter-section 34a of the fabric adjacent edge 34 is tucked inwardly and wrapped around guide member 82. Next, the fabric is pulled over member 90 and drawn upwardly while wrapping outer quarter-section 33a around guide member 101 and wrapping outer quarter-section 34a around guide member 111. This brings edges 33 and 34 into overlapping relationship and as the fabric goes upwardly these overlapping edges straddle connecting rod 112. Thus the fabric, as it moves around folding means 16, first moves downwardly in a vertical direction with edges 33 and 34 being folded inwardly. As the fabric moves across folding element 66, it reverses its direction of travel and moves upwardly with quarter-sections 33a and 34a moving inwardly toward each other and the fabric's central longitudinal axis. Finally, as the fabric moves across folding elements 67 and 68, quarter-sections 33a and 34a change direction and move upwardly bringing edges 33 and 34 into overlapping, parallel positions. Thus the fabric is folded into tube form and the tube advances over roller 18 to the extruder.

EXTRUDER

In manually winding the fabric through apparatus 10, edge 33 of the tube is drawn over the top of extruder die 20 and edge 34 of the tube is drawn beneath the extruder die, locating the extruder die between overlapping edges 33 and 34. Adhesive is applied to edge 34 along a band corresponding essentially to the width of overlapping edge portions. As shown in FIG. 5, adhesive is applied to both edges 33 and 34. This, however, is optional. Chill rollers 21–23 immediately follow die 20 and they press the edges 33 and 34 together, insuring fixation of the adhesive to both edges. The adhesive on the edge surfaces flows through the openings in the weave and interlocks overlapping edges 33 and 34 together to form a seam.

DANCER ROLLER ASSEMBLY

FIGS. 8–10 show dancer roller 26 mounted between the ends of two swinging arms. Only one arm 120 is shown in these figures. The other ends of these arms are pivotally mounted between a pair of stanchions. Stanchion 121 is shown wherein arm 120 is mounted at point 122. Also on arm 120 is a half-moon cam 123, secured to the arm so that as the arm swings up and down this cam 123 rotates clockwise and counter-clockwise. The indent 123a of the cam strikes a limit switch 124 when the arm 120 is in an up position as shown in FIG. 9. In the down position of arm 120, the arm contacts limit switch 125. As will be discussed later, these switches 124 and 125 control the speed of drive motor 126.

CUTTER ASSEMBLY

FIGS. 8 and 10 show cutter 30 mounted on bar 127 which is pivotally mounted to frame 11a at point 128. Cam follower wheel 129 is also mounted to bar 127 between cutter 30 and point 128. This follower wheel 129 follows the cam edge of cam 130 secured to free-wheeling shaft 132 mounted on frame 11a. As cam 130 revolves, cutter 30 is raised (FIG. 8) and lowered (FIG. 10).

Cutter 30 includes heated blade 38 (preferably heated to about 950° F) whose leading edge 133a is angular and whose trailing edge 133b is vertical. This type of blade construction insures clean cutting of the tube. Immediately below blade 38 is a Teflon-covered platen roller 36. Covering platen roller 36 with any suitable stick-resistant material prevents the severed tube from clinging to this roller 36.

CONVEYOR

Figure 11:
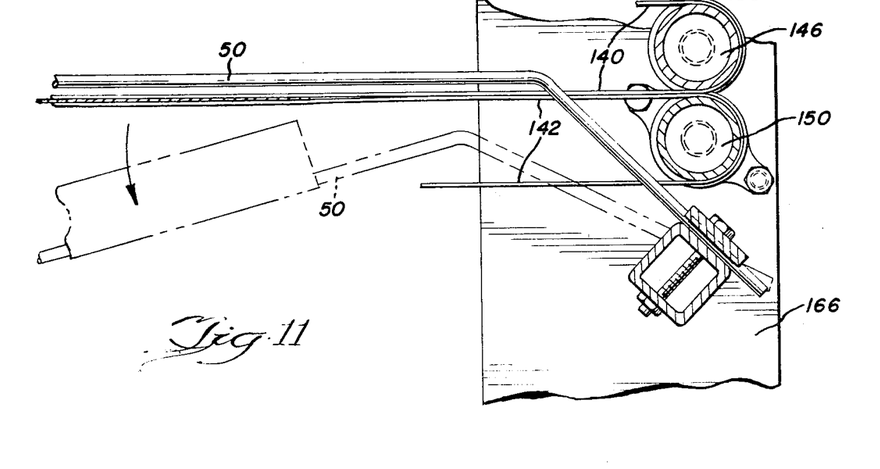
FIG. 11 is a side elevational view, partially in section, showing the swatter arm which removes severed tubes from the conveyor.
Figure 12:
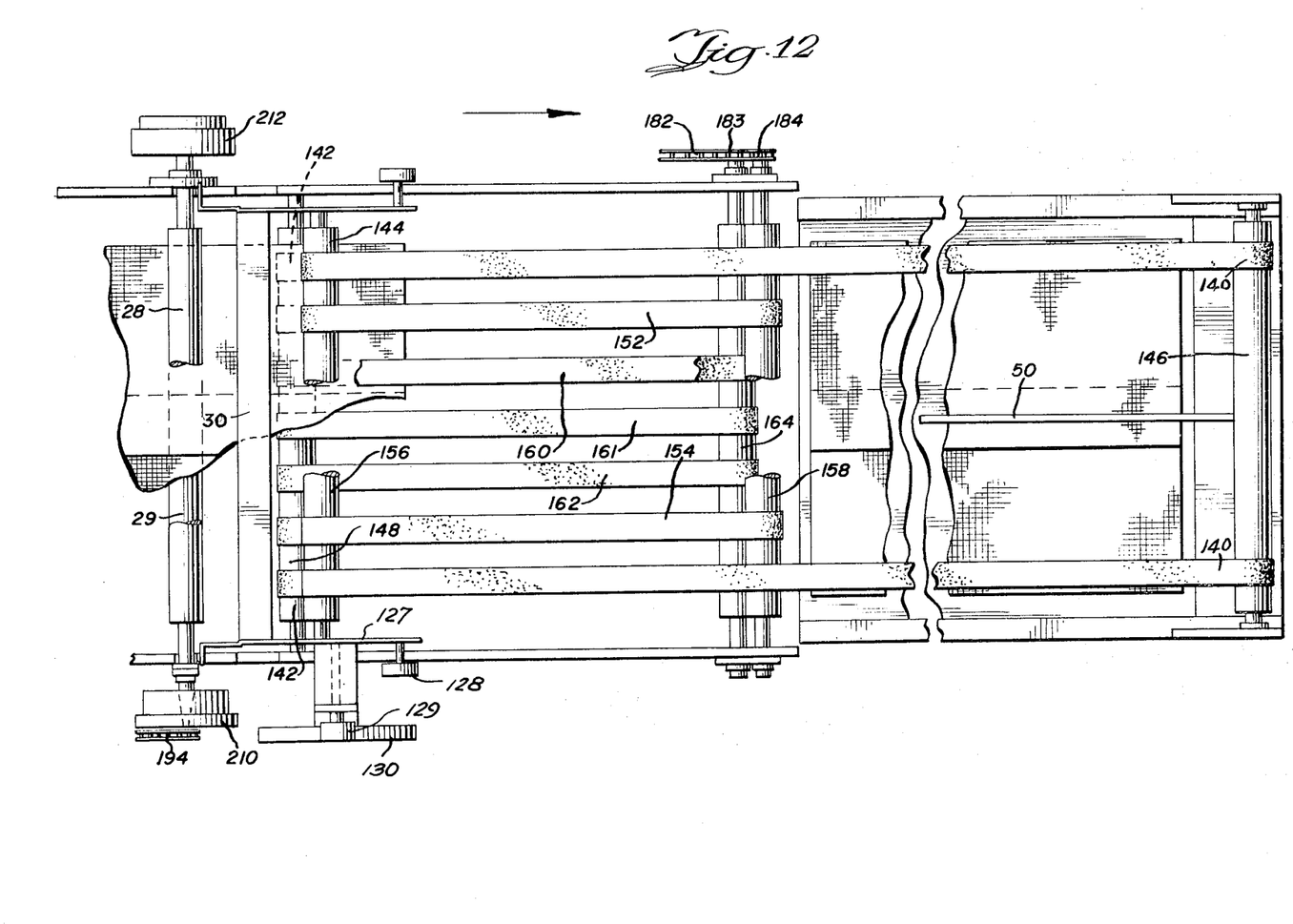
FIG. 12 is a plan view showing the conveyor which moves severed tubes from beneath the cutter.

As best shown in FIGS. 11 and 12, conveyor 32 includes two pairs of lateral conveyor belts 140 and 142 which run along the length of the conveyor. The upper belts 140 are wound about rollers 144 and 146, and lower belts 142 are wound about rollers 148 and 150 (FIG. 11). A series of upper and lower conveyor belts extend about half the length of conveyor 32. These include upper belts 152 and 154 wound about rollers 156 and 158, and lower belts 160–162 wound about roller 148 and roller 164. Swatter arm 50 is pivotally attached to support member 166 and is actuated by solenoid (not shown). This solenoid is turned on when a severed tube moves between photocell 46 and light source 48 (FIG. 1). Swatter arm 50, which is between lateral conveyor belt 140, moves downwardly to strike the tube and direct it toward table 52.

DRIVE SYSTEM

The drive system 44 shown in FIGS. 8 through 12 moves the tube through apparatus 10 continuously along the portion of path a prior to secondary drive rollers 28 and 29, and intermittently in a stop-start fashion subsequent to these secondary drive rollers.

Primary drive rollers 24 and 25 are driven continuously but at a variable rate of speed through sprockets 170–173 and chains 174 and 175. Motor 126, mounted to base frame 11b on the far side as viewed in FIG. 8, provides the motive force for primary drive rollers 24 and 25 and conveyor 32. It is a variable speed motor and includes a potentiometer control (not shown) including a resistor (not shown) which is switched into or out of circuit with the potentiometer to vary the speed. As will be explained in greater detail below, the actuation of switches 124 and 125 determines whether the resistor is in or out of circuit with the potentiometer.

Drive for roller 25 and conveyor 32 is as follows: Sprocket 173 is connected to output shaft 180 of motor 126, and chain 175 winds about this sprocket 173 and sprocket 172. Sprockets 172 and 171 are coupled to free-wheeling shaft 181 in stanchion 121. Sprocket 171 is a double sprocket, and chain 174 winds about one sprocket element of sprocket 171 and sprocket 170. Thus the rotational movement of the motor's output shaft 180 is transmitted through the sprocket and chain linkage to roller 25. The rotational movement of output shaft 180 is transmitted to conveyor 32 through the other sprocket element of sprocket 171 and chain 182, and sprockets 183 and 184, attached, respectively, to the end rollers 158 and 164 (FIG. 12). Chain 182 winds about the other element of sprocket 171 and sprockets 183 and 184. Sprocket 185 provides tension for chain 182.

Secondary drive rollers 28 and 29 are driven intermittently through sprockets 190–193, chains 194 and 195, slotted lever 196, arm 197, cam 130, sprockets 198 and 199, and chain 200. Constant speed motor 202 provides the motive force for secondary drive rollers 28 and 29.

The drive for roller 29 is as follows: Sprocket 199 is connected to output shaft 203 of motor 202, and chain 200 winds around this sprocket 199 and sprocket 198. Cam 130 and sprocket 198 are secured to free-wheeling shaft 132. Arm 197 is pivotally attached to the face of cam 130 at one end and at its other end is secured to lever 196. Lever 196 includes slot 196a, and the lower end of arm 197 is bolted in position in the slot but can be moved within the slot to adjust the arc through which sprockets 190-193 move. Different lengths in the stroke of arm 197, as controlled by position of lower arm end, result in different lengths of severed tubes. Lever 196 is attached securely to free-wheeling shaft 193a of sprocket 193. This shaft 193a cyclically moves sprocket 193, clockwise and counter-clockwise, through an arc of about 60° as arm 197 pivots with the circular movement of cam 130. Chain 195 winds around sprocket 193 and sprocket 192, and chain 194 winds around sprocket 191 and sprocket 190. Sprocket 190 is attached to the shaft of roller 29 and sprockets 191 and 192 are attached to freewheeling shaft 191a in stanchion 121a. Roller 29 has clutch 210 (FIG. 12) at one end and brake 212 at the other end. Mounted on frame 11a are switches 214 and 216. Switch 214 controls clutch 210 and switch 216 controls brake 212, and cam 130 actuates these switches as cam edge periodically engages their contactors.

In operation, as the seamed tube moves between primary drive rollers 24 and 25, winds about dancer and idler rollers 26 and 27, and moves into the nip of secondary drive rollers 28 and 29, constant speed motor 202 turns cam 130 which in turn raises and lowers cutter 30 and simultaneously drives the sprocket and chain assemblage turning the secondary drive rollers. Specifically, arm 197 actuates lever 196 which in turn drives the train of sprockets 190-193 and chains 194 and 195 clockwise and counter-clockwise through an arc up to approximately 60°. This turns shaft 29a of roller 29 (FIG. 12). First, the shaft 29a moves in a clockwise direction and then reverses itself and moves in a counter-clockwise direction. When shaft 29a is moving in a counter-clockwise direction (as viewed in FIG. 8), clutch 210 is actuated and the tube is advanced underneath raised cutter 30 and toward swatter arm 50. When shaft 29a is moved in a clockwise direction brake 212 is actuated, holding the tube between the nip of secondary drive rollers 28 and 29. At this point cam 130 moves into a position such that a hot knife blade 133 lowers and abuts platen roller 36, severing the tube (FIG. 10).

While secondary drive rollers 28 and 29 momentarily hold the tube stationary, primary drive rollers 24 and 25 continue feeding the tube. This causes a slack which dancer roller 26 takes up. If too great a slack develops in the tube, arm 120 swings down to contact switch 125. This switches the resistor into circuit with the potentiometer controlling the speed of motor 126. Motor 126 is slowed down and the rate at which the tube is fed by primary rollers 24 and 25 decreases. Thus the slack decreases, pulling the tube taut so dancer roller 26 moves up. Cam 123 on arm 120 begins to turn, moving toward switch 124. When dancer roller 26 is carried upwardly beyond a predetermined point, this cam 123 strikes limit switch 124. This switches the resistor out of circuit with the potentiometer controlling motor 126, causing the speed of the motor to increase. Thus slack again develops and dancer roller 26 moves downwardly. Cycling back and forth between lower and raised positions of dancer roller 26 takes up slack in the tube and leads to greater accuracy in the length of severed tubes.

Though our apparatus is described with specific reference to woven polymeric fabric, it could be used to make tubes from most generally flat sheet materials.

We claim:

1. Apparatus for making tubes from a roll of generally flat sheet material, comprising means for unwinding the sheet material from the roll and for moving said unwound sheet material along a predetermined path, means for movably mounting the roll so that said roll can move to and fro generally transverse to the sheet's direction of travel along said path, means connected to the movable mounting means for moving said roll to and fro, means along said path which sense an edge of the unwound sheet material and, in response to a lateral change in the position of the edge being sensed, actuate the roll moving means to return the edge to about its original position, means along said path for folding said unwound sheet material so that its longitudinal edges overlap slightly, said folding means including a. a first guide member at an angle of about 45° with respect to one longitudinal edge of the sheet material and having a first end near said one edge and a second end between said one edge and the central longitudinal axis of the sheet material;

b. a second guide member at an angle of about 45° with respect to the other longitudinal edge of the sheet material and having a first end near said other edge and a second end between said other edge and the central longitudinal axis of the sheet material, said first and second guide members being spaced apart but on the same side of the sheet material and sloping so that their second ends are further along the sheet's path of travel than their first ends;

c. a third guide member between and connected to the second ends of said first and second guide members and lying generally perpendicular to the central longitudinal axis of the sheet material;

d. a fourth guide member at an angle of about 45° with respect to one longitudinal edge of the sheet material and having a first end near said one edge and a second end between said one edge and the central longitudinal axis of the sheet material; and e. a fifth guide member at an angle of about 45° with respect to the other longitudinal edge of the sheet material and having a first end near said other edge and a second end between said other end and the central longitudinal axis of the sheet material, said fourth and fifth guide members being spaced apart, on the side of the sheet material opposite that of said first and second guide members and subsequent in the sheet's path of travel to said first and second guide members, and sloping so that their first ends crisscross and are further along the sheet's path of travel than their second ends, whereby said sheet's direction of travel as it moves across said first and second guide members is changed to turn said edges inwardly to move toward the central longitudinal axis of the sheet material, and said sheet's direction of travel as it moves across said third, fourth and fifth guide members is changed to bring the edges of the sheet into an overlapping position and to move said edges generally parallel to each other;

means along said path subsequent to the folding means for applying a sealing material to said overlapped edges and forming a seam along said overlapping edges, and means along said path for cutting the folded and seamed sheet material along a line which is transverse to the sheet's direction of travel along said path.

2. The apparatus of claim 1 wherein the sheet moving means includes first means which, along the forward portion of the path of the sheet material, move the sheet material continuously, and second means which, along the rearward portion of the path of the sheet material, move the sheet material intermittently.

3. The apparatus of claim 2 wherein a slack in the sheet material is developed because of the continuous and intermittent motion of the sheet material, said apparatus additionally including means along said path which compensate for said slack.

4. The apparatus of claim 1 wherein said cutting means includes a heated knife blade.

5. Apparatus for making tubes from a web of generally flat sheet material, comprising means for moving the web of sheet material along a predetermined path, means along said path for folding said sheet material so that its longitudinal edges overlap slightly, said folding means including a. a first guide member at an angle of about 45° with respect to one longitudinal edge of the sheet material having a first end near said one edge and a second end near the central longitudinal axis of the sheet material, b. a second guide member connected to second end of said first guide member and lying generally perpendicular to the central longitudinal axis of the sheet material, and c. a third guide member at an angle of about 45° with respect to said one edge of the sheet material having a first end near said one edge and a second end near the central longitudinal axis of the sheet material, d. said first and third guide members being spaced apart and on opposite sides of the sheet material and sloping opposite to each other, means along said path subsequent to the folding means for applying a sealing material to said overlapped edges and forming a seal along said overlapping edges, and means along said path for cutting the folded and seamed sheet material along a line which is transverse to the sheet's direction of travel along said path.

6. The apparatus of claim 2 wherein said web is wound up as a roll, and said apparatus additionally includes means for unwinding said roll, means for movably mounting said roll so that it can move to and fro generally transverse to the sheet's direction of travel along said path, means connected to said mounting means for moving said roll to and fro, and means along said path which sense an edge of the unwound sheet material and, in response to the position of the edge being sensed, actuates the roll moving means.

7. The apparatus of claim 5 wherein the sheet moving means includes first means which, along the forward portion of the path of the sheet material, move the sheet material continuously, and second means which, along the rearward portion of the path of the sheet material, move the sheet material intermittently.

8. The apparatus of claim 7 wherein a slack in the sheet material is developed because of the continuous and intermittent motion of the sheet material, said apparatus additionally including means along said path which compensate for said slack.

9. The apparatus of claim 5 wherein said cutting means includes a heated knife blade.

10. In an improved apparatus for making tubes from a roll of generally flat sheet material where unwound sheet material is folded so that its longitudinal edges overlap slightly and the sealing means apply at the overlapped edges a sealing material to form a seam along said edges, the improvement comprising means for insuring that the overlapped edges are in alignment with the sealing means so that sealing material is applied at said overlapped edges, said means including means for unwinding the sheet material from the roll and for moving the unwound sheet material along a predetermined path past said sealing means, means for movably mounting the roll so that said roll can move to and fro generally transverse to the sheet's direction of travel along said path, means connected to the movable mounting means for moving said roll to and fro, and means along said path which sense an edge of the unwound sheet material and, in response to a lateral change in position of the edge which would move overlapped edges out of alignment with the sealing means, which actuate the roll moving means to shift position of unwound sheet material so that the edge being sensed is returned to its original position bringing overlapped edges into alignment with the sealing means.

* * * * *